2,886,635

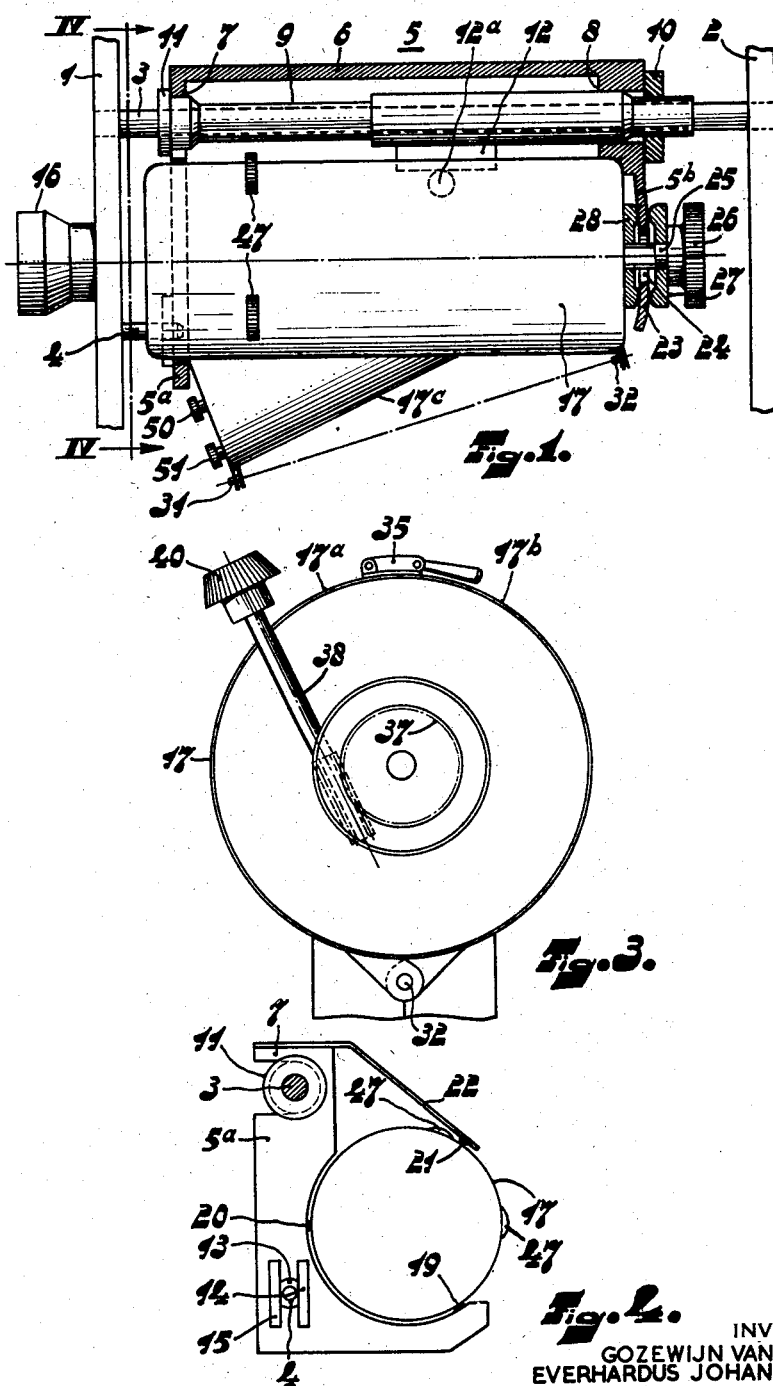

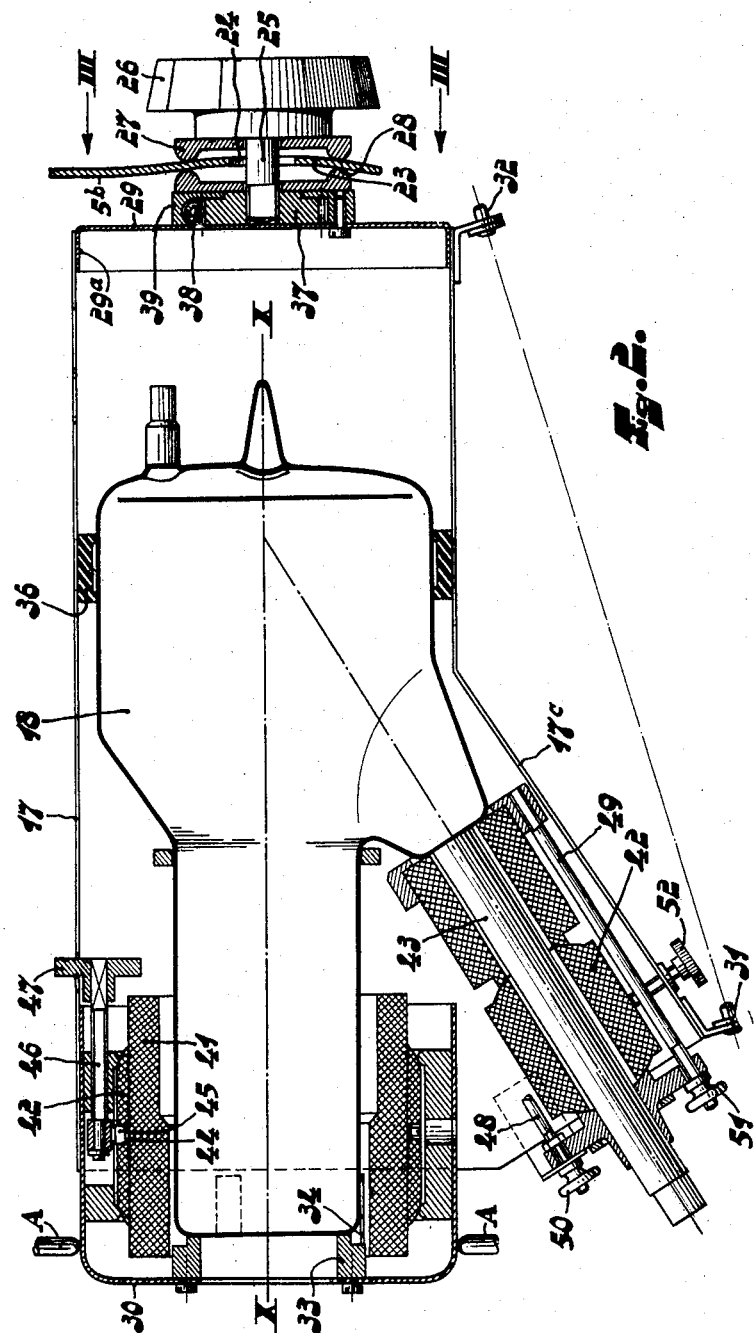

TELEVISION CAMERA TUBE MOUNTING

Gozewijn van Gelder and Everhardus Johannes Henricus Hemmers, Hilversum, Netherlands, assignors, by mesne assignments, to North American Philips Company, Inc., New York, N.Y., a corporation of Delaware Application September 10, 1954, Serial No. 455,172

Claims priority, application Netherlands September 23, 1953

4 Claims. (Cl. 178—7.2)

The present invention relates to a television camera.

It is known to secure the pickup tube of television cameras detachably in a frame adapted to be removed from the camera. Furthermore it is known that in the manufacture of glass bulbs for such pickup tubes measuring discrepancies invariably occur. Therefore said glass bulbs or parts thereof cannot directly be used for determining the correct location for the light-sensitive parts within the tube such as, for example, the so-called impact disc relative to the optical system of the camera comprising the tube. In order to mitigate said disadvantage it has been proposed to secure one or more metal rings rigidly to the glass tube. In such systems great care has to be taken, after manufacturing of the tube proper, on adjusting particular faces of such rings relative to the essential parts of the tube, hence such tubes are costly and focusing is time consuming in manufacture.

The present invention has for its object to mitigate said disadvantages. In a television camera in accordance with the invention the pickup tube is rigidly secured in a support adapted to be removed therefrom and secured, in turn, in a detachable manner in the frame removable from the camera. Said support comprises means for adjusting it together with the tube relative to said frame preferably both in a lateral direction and in the direction of rotation.

In contradistinction to the method of fastening the known pickup tube in the camera, the pickup tube is rigidly mounted in a support adapted to be removed therefrom, adjustment of the essential parts of the tube relatively to the optical elements of the camera being effected by adjusting the tube together with a support relatively to the frame. The attachment of the tube in the support does not require complicated or expensive members, the sole condition being that the tube should have such a size as to permit firm attachment to its associated support, without said attachment being of a permanent nature. At variance with known constructions the support is even removable from the tube so that the support, if the tube becomes defective, can again be used for another tube.

In order to permit the desired adjustments of the tube in a lateral direction, the support and the frame, in a suitable embodiment of the invention, may be provided with adjusting means allowing the support to be fixed in an arbitrary number of tilted positions relatively to the frame, since the displacements of the tube in said lateral direction are only small as a rule.

In another form of the camera according to the invention, adjustment of the tube in a tangential direction is effected through a worm gear, which permits that part of the support, wherein the pickup tube is immovably secured, to be turned relatively to the support portion clamped against the plate-shaped part secured to the frame.

In another embodiment of the invention, the support also carries the focusing device(s) for the pickup tube, which device(s) is (are) adjustable relatively to the pickup tube by means also forming part of the support.

A preferred suitable form of the support comprises a bushing which is open throughout its length and adapted to be opened and closed by means of hinges and locking means, in which bushing the tube is fixed in position by means of one or more resilient elements so as to be laterally immovable.

In another form of the camera according to the invention, the frame is suspended in the camera from a single rail so as to be movable and adjustable in the direction of length of the pickup tube within the support, stops secured to the camera housing and the frame determining the position of the latter in a lateral direction relatively to the camera. In contradistinction to conventional construction of such cameras, where such a frame is suspended from two or more parallel rails, a single rail is sufficient, thus greatly simplifying the construction of the camera.

In order that the invention may be readily carried into effect, it will now be described, by way of example, with reference to the accompanying drawing, in which:

Fig. 1 shows, partly in elevation partly in cross-section, a portion of an embodiment of the housing of the television camera of the present invention with the associated lens, the rail secured in said housing together with the frame movable on it and the support for the pickup tube, and adjusting means for said members;

Fig. 2 is a sectional view on a larger scale of the support comprising the pickup tube and the adjusting means forming part of the support;

Fig. 3 is a view of the support of Fig. 2 taken in the direction of the arrows III—III in Fig. 2;

Fig. 4 is a view of the support of Fig. 1 in the frame of Fig. 1 taken in the direction of the arrows IV—IV in Fig. 1.

In Fig. 1, the rail of circular cross-section is secured in two rigid walls 1 and 2 of the camera housing (not shown) in such a manner that said rail extends between said walls. Secured to the wall 1 of the housing is a pin-shaped stop 4. The frame, shown in a sectional view in Fig. 1 and in elevation in Fig. 4, consists mainly of two yokes 5a and 5b interconnected through a beam 6. The yokes 5a and 5b each have a laterally open ear 7 and 8 respectively, permitting the frame 5 to be moved on and removed from the rail 3. The frame 5 does not rest directly on the rail 3 but on a sleeve 9 slidable on the rail 3, the frame 5 being clamped by means of a nut 10 to a stop 11 also forming part of said sleeve. The sleeve 9 carries a rack 12 actuated by a pinion 12a which is secured to a shaft (not shown) fixedly supported in the camera housing and provided with a control knob. The yoke 5a is furnished at its side with two strips 14 and 15 (shown in Fig. 4) at each side of the opening 13 of the yoke, the space between the strips 14 and 15 slightly exceeding the thickness of the pin 4 which, together with the strips 14 and 15, acts as a stop. By the said stop construction it is ensured that, although the frame 5 extends only at a single point beyond the enter of gravity of said frame 5 with the parts secured therein, the correct position of said frame in a lateral direction in the camera housing is maintained. The length of the pin 4 is naturally chosen in accordance with the required mobility of the frame 5 along the rail 3.

When the pinion 12a is rotated by means of the control knob (not shown), the frame 5 with its associated parts moves over the rail 3 in one or in the other direction with the result that the spacing between the impact disc of the pickup tube in the frame 5 changes relatively to the lens 16 secured to the wall 1 of the camera housing.

A support 17 for the pickup tube 18 is secured in the frame 5 in the yokes 5a and 5b, said support being supported at its left-hand end (Fig. 1) at three points of the yoke 5a. Two of said points 19 and 20 (shown in Fig. 2) are situated on the yoke itself, whereas the point 21 is a projecting part of a plate spring 22 secured to the yoke 5a. The yoke 5b exhibits a somewhat spherical embossing 23 with a laterally accessible opening 24.

The support 17 is adapted to be secured in the frame 5 by placing it with its left hand end in the three-point bearing 19—20—21 and by slipping the pin-shaped projection 25 forming part of the support 17 through the entrance (not shown) of the opening 24 and fixing it therein by means of the device referred to later.

The pin-shaped projection 25 is provided with an internally threaded control knob 26 comprising a thrust ring 27, the pin 25 furthermore carrying a second thrust ring 28 rigidly secured thereto (as shown in Figs. 1 and 2). By turning the knob 26 the thrust ring 27 is moved towards the thrust ring 28 and at a given instant said rings are clamped against the portion 23 of the yoke 5b, thus obtaining a fixed position in a lateral direction of the support 17 relative to the frame 5. The position in a lateral direction of the support 17 together with the pickup tube 18 relative to the frame 5 is adjustable since the pin 25 engages the openin 24 with a fair amount of play.

The support 17 (shown in Fig. 2) substantially consisting of a sleeve with an oblique projecting part 17c mainly comprises an end 29 with a flanged edge 29a, a cylindrical portion consisting of two halves 17a and 17b (shown in Fig. 3) and a front end 30 which, together with the half 17b of the cylindrical portion and the end 29 secured to said half by means of the flanged edge 29a, constitutes an assembly. The half 17a of the cylindrical portion of the support is secured thereto by means of hinges 31 and 32 so that the support 17 can be opened and closed. Secured to the front end 30 is a ring 33 which acts as a stop and is provided with three resilient strips 34 guiding the left hand end of the pickup tube 18. The support 17 furthermore comprises latching means 35 (Fig. 3) by means of which the support 17 can be closed and latched.

An open resilient ring 36 (Fig. 2) is secured at the inner side of the support 17 and accommodates the pickup tube 18. When the pickup tube 18 is placed in the support 17, said support is opened by means of the hinges 31 and 32 and the left-hand end of the pickup tube 18 is inserted between the resilient tongues 34. The support 17 is closed by means of the hinges 31 and 32, the parts of the ring 36 engaging the thickest portion of the pickup tube 18. Upon subsequent tightening of the support 17 around the pickup tube 18 by means of the latching device 35, which is possible through the resilient ring 36, this ring is elastically compressed so as to secure the pickup tube 18 immovably in the support 17. This permits the impact disc of the pickup tube 18 to be adjusted by displacing the tube 18 together with the support 17.

Adjustment of the support 17 together with the pickup tube 18 relative to the frame 5 is effected by loosening the knob 26 and subsequently slightly tilting, inasmuch as allowed by the clearance between the pin 25 and the inner wall of the opening 24, the support 17 together with the tube 18 in the three-point bearing 19—20—21. When the correct position is reached, the support 17 together with the tube 18 is fixed in position by again tightening the knob 26.

The support 17 together with the pickup tube 18 is adapted to be rotated within given limits about the axis X—X of the pickup tube 18 by means of a worm gear whereof the worm wheel 37 is rigidly secured to the end face 29 of the support 17 and the worm 38 is supported in a guide 39 adjacent the thrust ring 28. The worm 38 is provided with a control knob 40, Fig. 3. When the knob 40 is turned, the worm wheel 37, which is rigidly secured to the support 17, rotates in one or in the other direction relatively to the thrust ring 28.

In the present case, the support 17 is at the same time used as a supporting member for focusing coils 41 and 42 for the pickup tube and for the cathode-ray scanning device 43, the so-called electron gun of said tube. The focusing coil 41 loosely surrounding the left-hand end of the pickup tube comprises a sleeve-shaped part 42 with two recesses whereof only the recess 44 is visible in Fig. 2. Said recesses accommodate lugs 45 having a slightly rounded surface and projecting laterally from screw spindles 46. The screw spindles are supported in the support 17 and each comprises a control knob 47 partly protruding from said support. Since the outer wall of the sleeve 41 is locally spherical and rests in a corresponding supporting forming part of the support 17, the focusing coil 41 is slightly tiltable relatively to the end of the pickup tube 18 by turning the knobs 47.

A focusing mechanism adjustably fitted in the projecting part 17c of the support is arranged around the cathode-ray scanning device 43 of the pickup tube. Said focusing mechanism is operated by loosening nuts 50 and 51 screwed onto screwed ends 48 and 49 and slightly tilting the coil 42, which is slightly spherical at its ends, by means of the projecting part 52 relatively to the portion 43.

From what has been stated above it will be evident that the use of the support 17 in a television camera permits the use of a pickup tube which need not fulfil stringent measuring requirements with regard to its glass bulb so that it is neither necessary for this tube, prior to using it, to be furnished with accurately adjusted adapting surfaces, for example in the form of metal rings permanently secured to said tubes. On the contrary, said pickup tube can be secured by a single manipulation in the support 17, the tube being ultimately set by adjusting it together with the support. Should the pickup tube 18 become defective, the support 17 is removed from the tube and the same support may again be employed for another tube.

Should the pickup tube of a television camera become defective during operation, said tube together with the support is removed from the frame, which consequently remains in the camera, and a new support together with a tube is fitted in the frame. As an alternative, the complete frame together with the support and the tube is interchangeable.

Furthermore, the construction in accordance with the present invention particularly permits adjustment of the tube together with a support relatively to the frame prior to using the tube in the camera. Consequently, a spare pickup tube adjusted relatively to a spare frame by means of the associated support may be held in readiness for the camera. Should the tube employed in the camera become defective, it is only necessary to remove the defective tube together with the support and the frame from the camera and to replace it by the spare tube kept in readiness, which tube has already been adjusted relatively to the spare frame by means of its support.

While the invention has been described by means of specific examples and in specific embodiments, we do not wish to be limited thereto, for obvious modifications will occur to those skilled in the art without departing from the spirit and scope of the invention.

What is claimed is:

1. A television camera comprising a housing having a lens opening therein, a rail mounted in said housing, a supporting frame removably slidably mounted on said rail, a support member having an axis, a pickup tube having an optical axis, means rigidly removably mounting said tube in said support member in a manner whereby the axis of said tube is substantially coincident with the axis of said support member, said last-mentioned means comprising substantially resilient spacing elements interposed between said tube and said support member, and means movably mounting said support member on said supporting frame in a manner whereby the said support member may be axially displaced in relation to said lens opening, said last-mentioned movable mounting means comprising means rigidly removably mounting on said supporting frame an end of said support member adjacent said lens opening and means adjustably removably mounting on said supporting frame an end of said support member removed from said lens opening in a manner whereby the said support member is axially rotatable and said end of the said support member removed from the said lens opening is tiltable with respect to the said supporting frame and lens opening thereby permitting selective adjustment of the axis of said tube relative to the said lens opening.

2. A television camera comprising a housing having a lens opening therein, a rail mounted in said housing, a supporting frame removably slidably mounted on said rail, stop members on said supporting frame, a support member having an axis, a pickup tube having an optical axis substantially parallel to that of said rail, an annular focussing coil having a central aperture therein, said focussing coil being coaxially mounted on a portion of said tube, means mounting said focussing coil in said support member in a manner whereby the said focussing coil is axially rotatable about said tube, means rigidly removably mounting said tube in said support member in a manner whereby the axis of said tube is substantially coincident with the axis of said support member, said last-mentioned means comprising substantially resilient spacing elements interposed between said tube and said support member, and means movably mounting said support member on said supporting frame in a manner whereby the said support member may be axially displaced in relation to said lens opening, said last-mentioned movable mounting means comprising means rigidly removably mounting on said supporting frame an end of said support member adjacent said lens opening and means adjustably removably mounting on said supporting frame an end of said support member removed from said lens opening in a manner whereby the said support member is axially rotatable and said end of the said support member removed from the said lens opening is tiltable with respect to the said supporting frame and lens opening thereby permitting selective adjustment of the axis of said tube relative to the said lens opening.

3. A television camera comprising a housing having a lens opening therein, a rail mounted in said housing, a supporting frame removably slidably mounted on said rail, said supporting frame comprising a pair of spaced members, a plurality of projections on one of said spaced members adapted to rigidly hold a tube mounted thereon and a substantially curved plate portion having a substantially elongated slot therein affixed to the other of said spaced members, a support member having an axis and a pin affixed to an end thereof, a pickup tube having an optical axis, means rigidly mounting said tube in said support member in a manner whereby the axis of said tube is substantially coincident with the axis of said support member, said last-mentioned means comprising substantially resilient spacing elements interposed between said tube and said support member, said support member being mounted on said spaced members of said supporting frame in a manner whereby the said support member may be axially displaced in relation to said lens opening, an end of said support member adjacent said lens opening being rigidly removably mounted on said projections of said one spaced member of said supporting frame and said pin of said support member extending through said slot of said other spaced member of said supporting frame thereby adjustably removably mounting on said supporting frame an end of said support member removed from said lens opening in a manner whereby the said support member is axially rotatable and said end of the said support member removed from the said lens opening is tiltable with respect to the said supporting frame and lens opening thereby permitting selective adjustment of the axis of said tube relative to the said lens opening, and means for clamping said support member at said pin end thereof to said plate portion of said other spaced member of said supporting frame.

4. A television camera comprising a housing having a lens opening therein, a rail mounted in said housing, a supporting frame removably slidably mounted on said rail, said supporting frame comprising a pair of spaced members, a plurality of projections on one of said spaced members adapted to rigidly hold a tube mounted thereon and a substantially curved plate portion having a substantially elongated slot therein affixed to the other of said spaced members, a support member having an axis, said support member comprising substantially lateral halves, means for holding said halves together and a pin affixed to an end thereof, a pickup tube having an optical axis, means rigidly mounting said tube in said support member in a manner whereby the axis of said tube is substantially coincident with the axis of said support member, said last-mentioned means comprising substantially resilient spacing elements interposed between said tube and said halves of said support member, said support member being mounted on said spaced members of said supporting frame in a manner whereby the said support member may be axially displaced in relation to said lens opening, an end of said support member adjacent said lens opening being rigidly removably mounted on said projections of said one spaced member of said supporting frame and said pin of said support member extending through said slot of said other spaced member of said supporting frame thereby adjustably removably mounting on said supporting frame an end of said support member removed from said lens opening in a manner whereby the said support member is axially rotatable and said end of the said support member removed from the said lens opening is tiltable with respect to the said supporting frame and lens opening thereby permitting selective adjustment of the axis of said tube relative to the said lens opening, and means for clamping said support member at said pin end thereof to said plate portion of said other spaced member of said supporting frame.

References Cited in the file of this patent
UNITED STATES PATENTS

| | | |
|---|---|---|
| 2,681,947 | Jackson et al. | June 22, 1954 |

FOREIGN PATENTS

| | | |
|---|---|---|
| 831,940 | France | June 20, 1938 |
| 997,063 | France | Sept. 5, 1951 |